(12) United States Patent
Kodama et al.

(10) Patent No.: US 10,243,666 B2
(45) Date of Patent: Mar. 26, 2019

(54) COMMUNICATION APPARATUS AND SUBCARRIER SIGNAL ARRANGEMENT METHOD

(71) Applicant: MITSUBISHI ELECTRIC CORPORATION, Tokyo (JP)

(72) Inventors: Takahiro Kodama, Tokyo (JP); Kenji Ishii, Tokyo (JP); Tsuyoshi Yoshida, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 15/770,584

(22) PCT Filed: Mar. 1, 2016

(86) PCT No.: PCT/JP2016/056285
§ 371 (c)(1),
(2) Date: Apr. 24, 2018

(87) PCT Pub. No.: WO2017/149668
PCT Pub. Date: Sep. 8, 2017

(65) Prior Publication Data
US 2018/0316438 A1 Nov. 1, 2018

(51) Int. Cl.
*H04J 14/02* (2006.01)
*H04B 10/572* (2013.01)
(Continued)

(52) U.S. Cl.
CPC ........... *H04B 10/572* (2013.01); *H04J 1/00* (2013.01); *H04J 14/00* (2013.01); *H04J 14/02* (2013.01)

(58) Field of Classification Search
CPC .................................................. H04J 14/0298
See application file for complete search history.

(56) References Cited

U.S. PATENT DOCUMENTS 8,964,581 B2  2/2015  Takara et al.
9,100,137 B2  8/2015  Vassilieva et al.
(Continued)

FOREIGN PATENT DOCUMENTS

JP  2010-98544 A   4/2010
JP  2014-217053 A  11/2014
(Continued)

*Primary Examiner* — Nathan M Cors
(74) *Attorney, Agent, or Firm* — Birch, Stewart, Kolasch & Birch, LLP

(57) ABSTRACT

A communication apparatus comprises a regular optical transceiver that generates regular subcarrier signals serving as subcarrier signals, a narrowband optical transceiver capable of generating narrowband subcarrier signals serving as subcarrier signals each having a narrower frequency band than the regular subcarrier signal, and a subcarrier configuration determiner that determines the configuration of a plurality of subcarrier signals in a super-channel signal, based on information on the number of optical filter stages to pass through. The regular optical transceiver shifts the positions of the regular subcarrier signals in the super-channel signal, according to optical frequency shift amounts indicating shift amounts of the plurality of subcarrier signals represented by the configuration determined by the subcarrier configuration determiner. The narrowband optical transceiver shifts the positions of the narrowband subcarrier signals in the super-channel signal according to the optical frequency shift amounts.

9 Claims, 10 Drawing Sheets

(51) Int. Cl.
*H04J 1/00* (2006.01)
*H04J 14/00* (2006.01)

(56) References Cited

U.S. PATENT DOCUMENTS

| | | | |
|---|---|---|---|
| 2013/0336658 A1* | 12/2013 | Xia | H04J 14/0204 398/83 |
| 2014/0314415 A1* | 10/2014 | Vassilieva | H04J 14/0227 398/76 |
| 2015/0381276 A1 | 12/2015 | Saito et al. | |
| 2016/0204875 A1* | 7/2016 | Araki | H04B 10/572 398/34 |
| 2017/0117967 A1* | 4/2017 | Morea | H04B 10/2941 |
| 2017/0214488 A1* | 7/2017 | Vassilieva | H04B 10/50 |
| 2017/0222716 A1* | 8/2017 | Nakashima | H04B 10/0795 |

FOREIGN PATENT DOCUMENTS

| | | |
|---|---|---|
| JP | 2016-10040 A | 1/2016 |
| WO | WO 2011/030897 A1 | 3/2011 |

* cited by examiner

COMMUNICATION APPARATUS AND SUBCARRIER SIGNAL ARRANGEMENT METHOD

FIELD

The present invention relates to a communication apparatus performing communication with multiplexing a plurality of optical signals and a subcarrier signal arrangement method therefor.

BACKGROUND

In a core and metro optical communication network, large-capacity transmission with a rate exceeding 100 Gbps, that is, over-100 Gbps class transmission is required per optical fiber. Examples of a technique to implement over-100 Gbps class transmission include super-channel transmission in which a number of carrier waves called subcarriers are arranged in an extremely high density to transmit signals. By the super-channel transmission, usage efficiency of optical frequency is enhanced, and capacity enlargement is achieved. Meanwhile, in the super-channel transmission, interference occurs between adjacent subcarriers, and signal quality is degraded, since subcarriers are arranged with a high density on optical frequency.

In addition, in super-channel transmission in a core and metro optical communication network, optical filters for wavelength selection are arranged in a transmission path at multiple stages, and demultiplexing, multiplexing, path switching, and the like for a desired number of subcarriers. Consequently, in super-channel transmission, a subcarrier signal band other than a transmission band of the optical filters is removed, that is, signal quality is degraded due to a signal band being narrowed. Furthermore, in super-channel transmission, the optical filter transmission band becomes narrow depending on the number of optical filter stages to pass through, and also signal quality further worsens accordingly.

To suppress prevent signal quality degradation caused by interference between subcarriers and signal band narrowing in super-channel transmission in a core and metro optical communication network, it is necessary to determine an optical frequency band of a super-channel signal containing all subcarriers such that signal quality degradation does not occur. However, the optical filter transmission band is characterized in that the band discretely changes like in 12.5 GHz, for example, and thus a surplus band occurs in the optical frequency band of a super-channel signal depending on the number of optical filters. To address such a problem, Patent Literature 1 discloses a technique to effectively use an optical frequency band by arranging super-channel signals with narrowing the distance between the signals, in order to prevent occurrence of a surplus band between the super-channel signals.

CITATION LIST

Patent Literature

Patent Literature 1: WO 2011/030897 A

SUMMARY

Technical Problem

According to the above-described conventional technique, however, a surplus band may occur in a super-channel signal. Patent Literature 1 neither discloses nor suggests effective use of a surplus band in a super-channel signal.

The present invention has been made in view of the above circumstances, and an object of the present invention is to provide a communication apparatus that can improve transmission capacity by using a surplus band in a super-channel signal in super-channel transmission.

Solution to Problem

To solve the above-described problem and achieve the object, the present invention provides a communication apparatus comprising: a regular optical transceiver including a first number of optical transceivers to each generate a regular subcarrier signal serving as a subcarrier signal; a narrowband optical transceiver including a second number of optical transceivers each capable of generating a narrowband subcarrier signal serving as a subcarrier signal having a narrower frequency band than the regular subcarrier signal; and a subcarrier configuration determiner to determine a configuration of a plurality of subcarrier signals in a super-channel signal, based on information on the number of optical filter stages to pass through, which is information on the number of optical filters through which the super-channel signal containing the plurality of subcarrier signals passes in a transmission path when the super-channel signal is transmitted to a counterpart communication apparatus, wherein the regular optical transceiver shifts a position of the regular subcarrier signal in the super-channel signal, according to optical frequency shift amounts indicating shift amounts of the plurality of subcarrier signals indicated by the configuration determined by the subcarrier configuration determiner, and the narrowband optical transceiver shifts a position of the narrowband subcarrier signal in the super-channel signal, according to the optical frequency shift amounts.

Advantageous Effects of Invention

The communication apparatus according to the present invention achieves the effect that transmission capacity can be improved by using a surplus band in a super-channel signal in super-channel transmission.

DESCRIPTION OF EMBODIMENTS

Hereinafter, a communication apparatus and a subcarrier signal arrangement method according to an embodiment of the present invention will be described in detail with reference to the drawings. Note that the invention is not necessarily limited by the embodiment.

Embodiment

Figure 1:
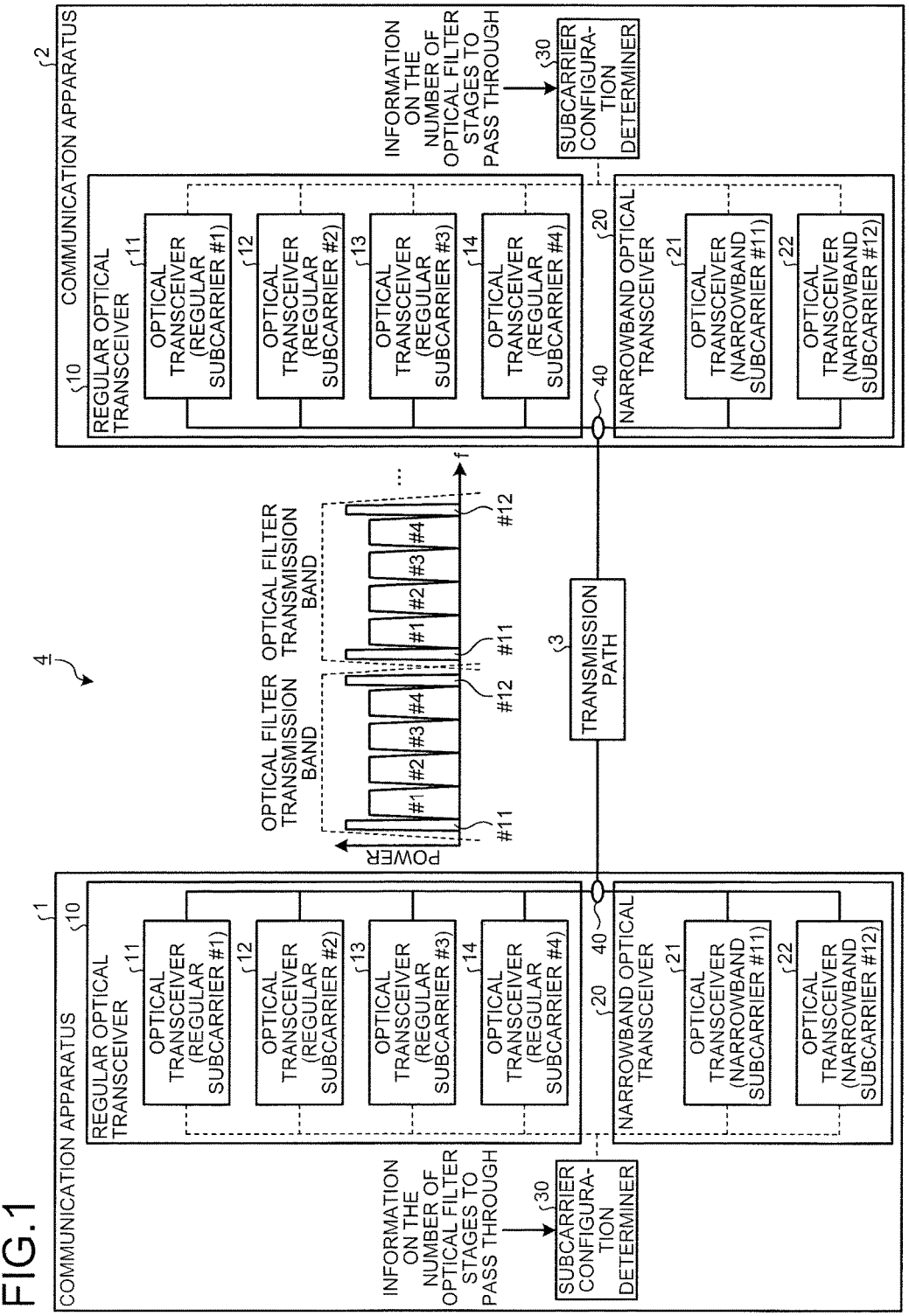
FIG. 1 is a diagram illustrating an exemplary configuration of an optical transmission system including communication apparatuses.

FIG. 1 is a diagram illustrating an exemplary configuration of an optical transmission system 4 including communication apparatuses 1 and 2 according to an embodiment of the present invention. The optical transmission system 4 includes the communication apparatuses 1 and 2, and a transmission path 3. The optical transmission system 4 is a communication system that transmits a super-channel signal, serving as an optical signal in a super-channel transmission scheme, and for example, can be a core and metro optical communication network. In the optical transmission system 4, the communication apparatus 1 or 2 transmits and receives a super-channel signal via the transmission path 3. Optical filters for wavelength selection are disposed at multiple stages in the transmission path 3.

The communication apparatuses 1 and 2 have equal configurations. Thus, the present embodiment is intentionally directed to describing a case where the communication apparatus 1 transmits a super-channel signal to the communication apparatus 2 via the transmission path 3. When the communication apparatus 1 transmits a super-channel signal to the communication apparatus 2, the optical frequency band of the super-channel signal becomes narrower every time the super-channel signal passes through an optical filter. Therefore, the communication apparatus 1 determines the optical frequency band of a super-channel signal, based on the number of optical filters through which the super-channel signal passes in the transmission path 3 when transmitting the super-channel signal to the communication apparatus 2, so as to provide a desired optical filter transmission band at a point in time when the communication apparatus 2 receives the super-channel signal.

Here, depending on the optical frequency band of the super-channel signal, a surplus band may occur in the super-channel signal since the optical filter transmission band changes discretely. In the present embodiment, the communication apparatus 1 arranges, at shorten interval, two or more subcarrier signals placed in a super-channel signal while using a surplus band in the super-channel signal, thereby to improve transmission capacity.

Narrowband subcarriers #11 and #12, serving as two narrowband subcarrier signals, illustrated in FIG. 1 are subcarrier signals to be inserted into a super-channel signal by the communication apparatus 1 when there is a surplus band in the super-channel signal. Information contained in the narrowband subcarriers #11 and #12 includes, for example, a data signal and an error-correcting code, but the information is not limited to the signal or code. When there is no surplus band in a super-channel signal, the super-channel signal is composed of regular subcarriers #1, #2, #3, and #4, serving as four regular subcarrier signals.

FIG. 1 illustrates an example where the regular subcarriers #1, #2, #3, and #4 and the narrowband subcarriers #11 and #12 are multiplexed in the communication apparatus 1. This is just one example, and the numbers of regular subcarriers and narrowband subcarriers to be multiplexed are not limited to those in this example. The narrowband subcarriers #11 and #12 are subcarrier signals having a narrower frequency band than the regular subcarriers #1 to #4. In the description below, regular subcarrier signals and narrowband subcarrier signals are sometimes collectively referred to as subcarrier signals. In FIG. 1, among lines connecting the components, lines indicating paths of optical signals are represented by solid lines and lines indicating paths of electrical signals are represented by dotted lines.

The configurations of the communication apparatuses 1 and 2 will be described.

The communication apparatus 1, serving as a first communication apparatus, includes a regular optical transceiver 10, a narrowband optical transceiver 20, a subcarrier configuration determiner 30, and an optical multiplexer/demultiplexer 40.

The regular optical transceiver 10 includes optical transceivers 11, 12, 13, and 14. The regular optical transceiver 10 is composed of a first number of (herein, four) optical transceivers. The optical transceiver 11 generates and outputs an optical signal of the regular subcarrier #1 that is a regular subcarrier signal. The optical transceiver 12 generates and outputs an optical signal of the regular subcarrier #2 that is a regular subcarrier signal. The optical transceiver 13 generates and outputs an optical signal of the regular subcarrier #3 that is a regular subcarrier signal. The optical transceiver 14 generates and outputs an optical signal of the regular subcarrier #4 that is a regular subcarrier signal. In this way, the regular optical transceiver 10 generates and outputs the regular subcarriers #1 to #4.

The narrowband optical transceiver 20 includes optical transceivers 21 and 22. The narrowband optical transceiver 20 is composed of a second number of (herein, two) optical transceivers. The optical transceiver 21 can generate and output an optical signal of the narrowband subcarrier #11 that is a narrowband subcarrier signal. The optical transceiver 22 can generate and output an optical signal of the narrowband subcarrier #12 that is a narrowband subcarrier signal. The narrowband optical transceiver 20 generates and outputs an optical signal with one or each of the narrowband subcarriers #11 and #12, based on the number of narrowband subcarriers determined by the subcarrier configuration determiner 30. Otherwise, the narrowband optical transceiver 20 generates neither of the optical signals having the narrowband subcarriers #11 and #12, based on the number of narrowband subcarriers determined by the subcarrier configuration determiner 30.

The optical transceivers 21 and 22 of the narrowband optical transceiver 20 each include a transmission digital filter in which tap coefficients of a finite impulse response (FIR) filter are set based on FIR tap coefficients that are tap coefficients of the FIR filter, outputted from the subcarrier configuration determiner 30, and a narrowband subcarrier of a desired optical frequency band is generated. The detailed configuration of the narrowband optical transceiver 20 will be described later.

All of the regular subcarriers #1 to #4 and the narrowband subcarriers #11 and #12 are carrier waves having different optical frequencies, that is, different optical wavelengths.

The subcarrier configuration determiner 30 acquires information on the number of optical filter stages to pass through, which is information on the number of optical filters to pass through in the transmission path 3 through which a super-channel signal containing a plurality of subcarrier signals is transmitted to the counterpart communication apparatus 2. The subcarrier configuration determiner 30 determines the configurations of the regular subcarriers #1 to #4 in a super-channel signal, and whether to generate the narrowband subcarriers #11 and #12 and the configurations thereof, based on the information on the number of optical filter stages to pass through. The detailed configuration of the subcarrier configuration determiner 30 will be described later.

The optical multiplexer/demultiplexer 40 couples, that is, multiplexes optical signals having the regular subcarriers #1 to #4 outputted from the optical transceivers 11 to 14 of the regular optical transceiver 10, and optical signals having the narrowband subcarriers #11 and #12 outputted from the optical transceivers 21 and 22 of the narrowband optical transceiver 20, and outputs the resultant signal to the transmission path 3. The optical multiplexer/demultiplexer 40 also demultiplexes an optical signal from the communication apparatus 2 received via the transmission path 3 into six optical signals, and outputs the optical signals to the optical transceivers 11 to 14 of the regular optical transceiver 10 and the optical transceivers 21 and 22 of the narrowband optical transceiver 20, respectively in correspondence with the optical frequencies.

The configuration of the communication apparatus 2 that is a second communication apparatus is the same as of the communication apparatus 1 as described previously. The optical transceivers 21 and 22 of the narrowband optical transceiver 20 each include a reception digital filter that sets tap coefficients of an FIR filter, based on FIR tap coefficients outputted from the subcarrier configuration determiner 30, and extracts a narrowband subcarrier signal of a desired frequency band.

Figure 2:
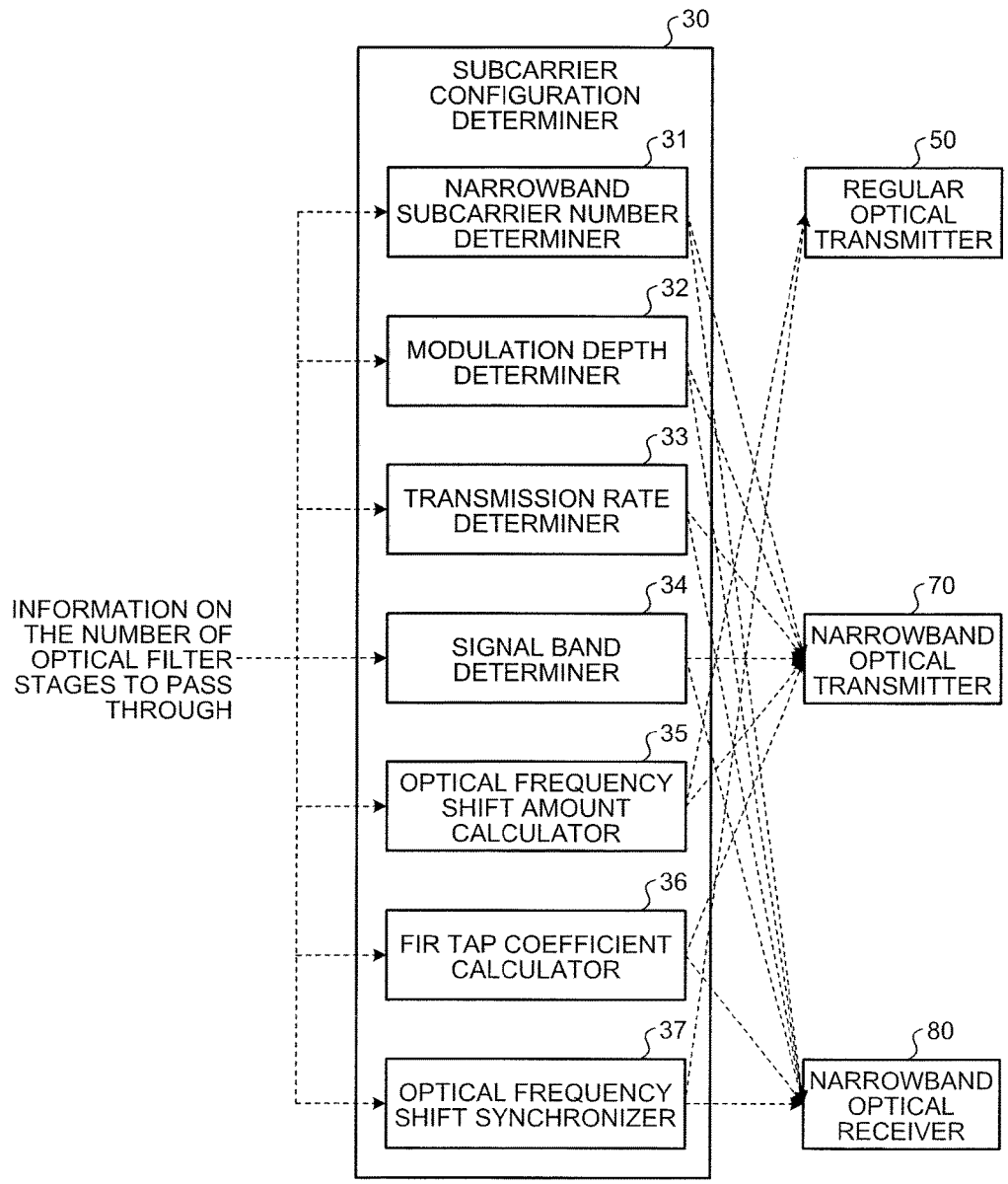
FIG. 2 is a block diagram illustrating an exemplary configuration of a subcarrier configuration determiner included in the communication apparatus.

FIG. 2 is a block diagram illustrating an exemplary configuration of the subcarrier configuration determiner 30 included in each of the communication apparatuses 1 and 2 according to the embodiment of the present invention. The subcarrier configuration determiner 30 includes a narrowband subcarrier number determiner 31, a modulation depth determiner 32, a transmission rate determiner 33, a signal band determiner 34, an optical frequency shift amount calculator 35, an FIR tap coefficient calculator 36, and an optical frequency shift synchronizer 37. As will be described below, the subcarrier configuration determiner 30 determines, as the configurations of narrowband subcarriers and regular subcarriers in a super-channel signal, the number of narrowband subcarriers to be inserted into the super-channel signal, the modulation scheme, the transmission rate, the signal band, the optical frequency shift amounts of the narrowband subcarriers and the regular subcarriers, and the order in which the positions of the regular subcarriers are shifted.

Based on the information on the number of optical filter stages to pass through, the narrowband subcarrier number determiner 31 determines an optical frequency band, i.e., a band in which a plurality of subcarriers is disposed in a super-channel signal, that is, an optical filter transmission band, and calculates a surplus band in the super-channel signal to determine the number of narrowband subcarriers to be inserted into the super-channel signal.

The modulation depth determiner 32 determines a modulation scheme of the narrowband subcarrier, based on the surplus band calculated by the narrowband subcarrier number determiner 31 using the information on the number of optical filter stages to pass through.

The transmission rate determiner 33 determines a transmission rate of the narrowband subcarrier, based on the surplus band calculated by the narrowband subcarrier number determiner 31 using the information on the number of optical filter stages to pass through.

The signal band determiner 34 determines a signal band of the narrowband subcarrier in the super-channel signal, based on the surplus band calculated by the narrowband subcarrier number determiner 31 using the information on the number of optical filter stages to pass through.

Based on the number of narrowband subcarriers determined by the narrowband subcarrier number determiner 31 and the signal band determined by the signal band determiner 34, the optical frequency shift amount calculator 35 calculates optical frequency shift amounts indicating the amounts of shifts of the optical frequencies of the regular subcarriers #1 to #4 to be outputted from regular optical transmitters 50 of the regular optical transceiver 10, or optical frequency shift amounts of the regular subcarriers #1 to #4 to be outputted from the regular optical transmitters 50 of the regular optical transceiver 10, and optical frequency shift amounts indicating the amounts of shifts of the optical frequencies of the narrowband subcarriers #11 and #12 to be outputted from narrowband optical transmitters 70 of the narrowband optical transceiver 20.

Based on the number of narrowband subcarriers to be inserted, the modulation depth, the transmission rate, and others, the FIR tap coefficient calculator 36 calculates the FIR tap coefficients of transmission digital filters of the narrowband optical transmitters 70 and reception digital filters of narrowband optical receivers 80, the narrowband optical transmitters 70 and the narrowband optical receivers 80 being included in the optical transceivers 21 and 22 of the narrowband optical transceiver 20.

The optical frequency shift synchronizer 37 controls timings of optical frequency shifts of the subcarrier signals of the regular subcarriers #1 to #4 to be outputted from the regular optical transmitters 50 of the regular optical transceiver 10, and the narrowband subcarriers #11 and #12 to be outputted from the narrowband optical transmitters 70 of the narrowband optical transceiver 20. When one or both of the narrowband subcarriers #11 and #12 are inserted into a super-channel signal, the optical frequency shift synchronizer 37 determines the order in which the positions of the regular subcarriers #1 to #4 are shifted, based on the signal band or bands in the super-channel signal in which the narrowband subcarrier(s) #11 and/or #12 are disposed.

Figure 3:
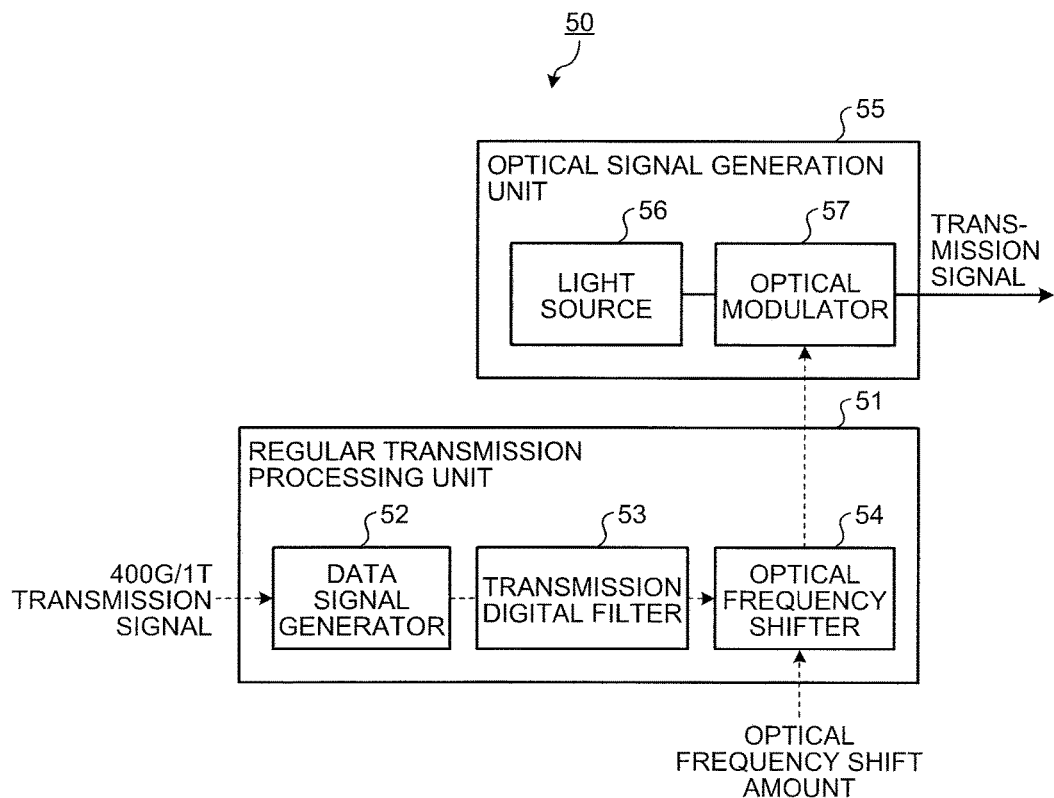
FIG. 3 is a block diagram illustrating an exemplary configuration of a regular optical transmitter included in an optical transceiver of a regular optical transceiver in the communication apparatus.

FIG. 3 is a block diagram illustrating an exemplary configuration of the regular optical transmitters 50 included in the optical transceivers 11 to 14 of the regular optical transceivers 10 in the communication apparatuses 1 and 2 according to the embodiment of the present invention. Each regular optical transmitter 50 includes a regular transmission processing unit 51 and an optical signal generation unit 55.

The regular transmission processing unit 51 includes a data signal generator 52, a transmission digital filter 53, and an optical frequency shifter 54.

The data signal generator 52 generates a data signal from a transmission signal inputted therein (e.g. a 400 G transmission signal or a 1 T transmission signal). Specifically, the data signal generator 52 performs processing of error-correction-coding information to be transmitted, and further performs processing of symbol mapping to generate a data signal, based on a modulation scheme such as 2-value phase modulation by binary phase shift keying (BPSK), 4-value phase modulation by quadrature phase shift keying (QPSK), or 16-value amplitude phase modulation by 16 quadrature amplitude modulation (16 QAM). There are no particular restrictions on specific processing details of the data signal generator 52 and the configuration of the data signal generator 52.

The transmission digital filter 53 shapes the data signal into a spectrum of a desired frequency band, using a Nyquist filter, for example.

The optical frequency shifter 54 shifts an optical frequency of the data signal obtained after the spectral shaping, based on an optical frequency shift amount determined by the subcarrier configuration determiner 30.

The optical signal generation unit 55 includes a light source 56 and an optical modulator 57.

The light source 56 sends out continuous light.

The optical modulator 57 modulates the continuous light sent out from the light source 56, based on the data signal serving as an electrical signal outputted from the optical frequency shifter 54, thereby to generate an optical signal. The optical modulator 57 outputs a transmission signal, which is the generated optical signal, to the optical multiplexer/demultiplexer 40.

Figure 4:
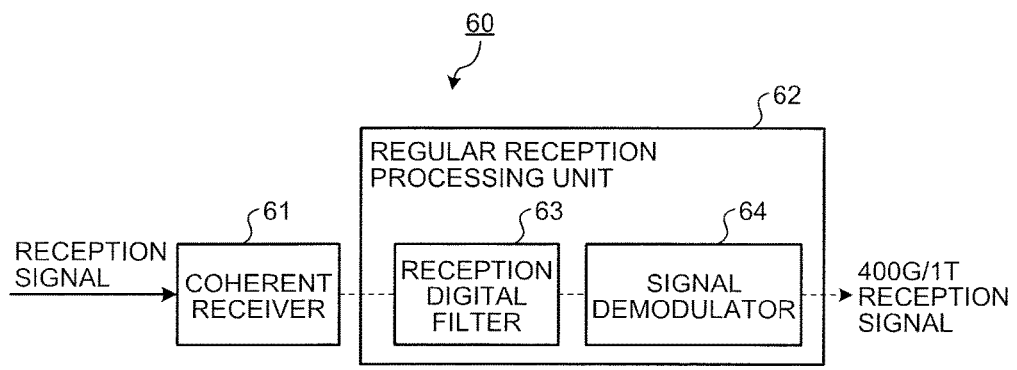
FIG. 4 is a block diagram illustrating an exemplary configuration of a regular optical receiver included in the optical transceiver of the regular optical transceiver in the communication apparatus.

FIG. 4 is a block diagram illustrating an exemplary configuration of a regular optical receiver 60 included in each of the optical transceivers 11 to 14 of the regular optical transceivers 10 in the communication apparatuses 1 and 2 according to the embodiment of the present invention. The regular optical receiver 60 includes a coherent receiver 61 and a regular reception processing unit 62.

The coherent receiver 61 converts an optical signal received via through transmission path 3 into an electrical signal.

The regular reception processing unit 62 includes a reception digital filter 63 and a signal demodulator 64.

The reception digital filter 63 filters an electrical signal inputted from the coherent receiver 61 with respect to the spectrum of the electrical signal, using a Nyquist filter or the like, to extract a spectrum of a desired frequency band.

The signal demodulator 64 demodulates the electrical signal obtained by the spectral extraction of the reception digital filter 63.

Figure 5:
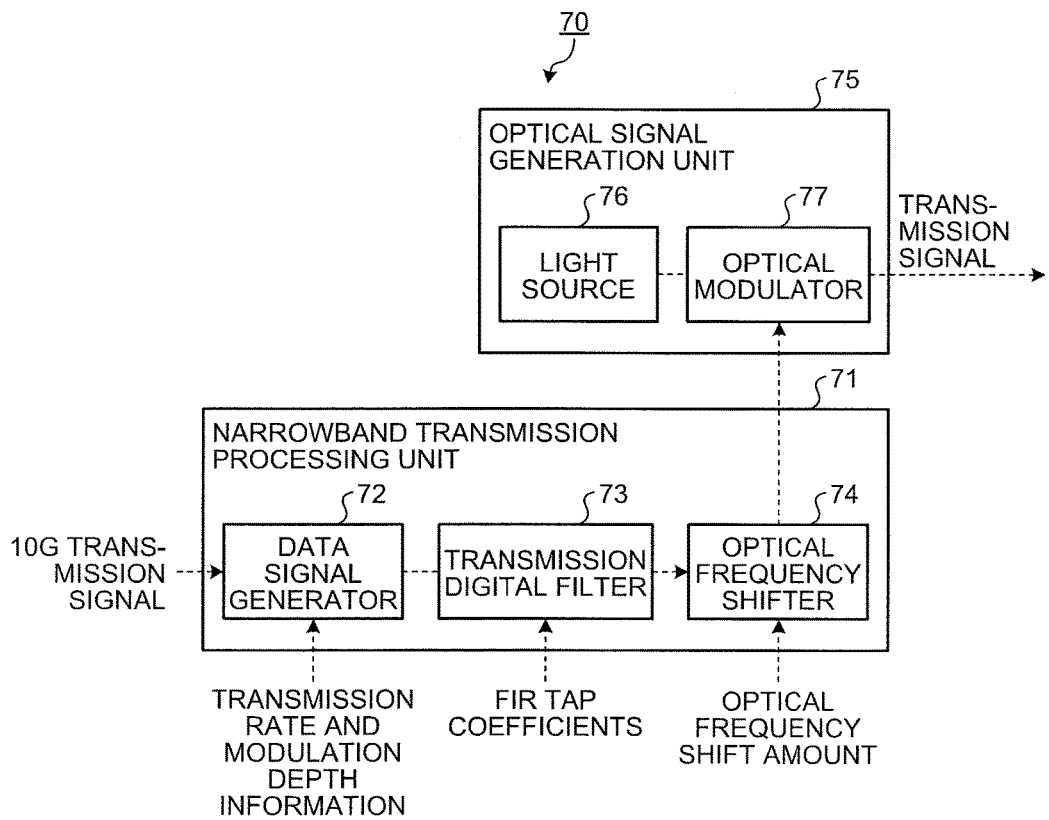
FIG. 5 is a block diagram illustrating an exemplary configuration of a narrowband optical transmitter included in an optical transceiver of a narrowband optical transceiver in the communication apparatus.

FIG. 5 is a block diagram illustrating an exemplary configuration of the narrowband optical transmitter 70 included in each of the optical transceivers 21 to 22 of the narrowband optical transceivers 20 in the communication apparatuses 1 and 2 according to the embodiment of the present invention. The narrowband optical transmitter 70 includes a narrowband transmission processing unit 71 and an optical signal generation unit 75.

The narrowband transmission processing unit 71 includes a data signal generator 72, a transmission digital filter 73, and an optical frequency shifter 74.

The data signal generator 72 generates a data signal from a transmission signal inputted therein (e.g. a 10 G transmission signal) based on a transmission rate and a modulation depth which have been determined by the subcarrier configuration determiner 30. Specifically, the data signal generator 72 performs processing of error-correction-coding information to be transmitted, and further performs processing of symbol mapping on the basis of a modulation scheme such as 2-value phase modulation by BPSK, 4-value phase modulation by QPSK, or 16-value amplitude phase modulation by 16 QAM, thereby to generate a data signal. There are no particular restrictions on specific processing details of the data signal generator 72 and the configuration of the data signal generator 72. An example of the 10 G transmission signal is a 10 G client signal.

The transmission digital filter 73 shapes the data signal into a spectrum of a desired frequency band, using a Nyquist filter or the like, based on FIR tap coefficients determined by the subcarrier configuration determiner 30.

The optical frequency shifter 74 shifts an optical frequency of the data signal obtained after the spectral shaping, based on an optical frequency shift amount determined by the subcarrier configuration determiner 30.

The optical signal generation unit 75 includes a light source 76 and an optical modulator 77.

The light source 76 sends out continuous light.

The optical modulator 77 modulates the continuous light sent out from the light source 76, based on the data signal serving as an electrical signal outputted from the optical frequency shifter 74, thereby to generate an optical signal. The optical modulator 77 outputs a transmission signal, which is the generated optical signal, to the optical multiplexer/demultiplexer 40.

Figure 6:
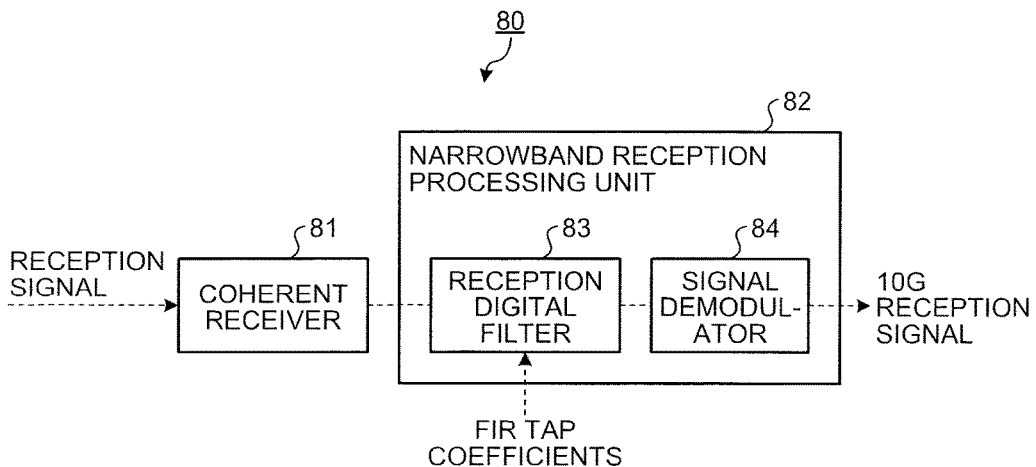
FIG. 6 is a block diagram illustrating an exemplary configuration of a narrowband optical receiver included in FIG. 7 is a graph showing an example of a relationship between the number of optical filters arranged in a transmission path in the optical transmission system and an optical filter transmission band.

FIG. 6 is a block diagram illustrating an exemplary configuration of the narrowband optical receiver 80 included in each of the optical transceivers 21 and 22 of the narrowband optical transceivers 20 in the communication apparatuses 1 and 2 according to the embodiment of the present invention. The narrowband optical receiver 80 includes a coherent receiver 81 and a narrowband reception processing unit 82.

The coherent receiver 81 converts an optical signal received via the transmission path 3 into an electrical signal.

The narrowband reception processing unit 82 includes a reception digital filter 83 and a signal demodulator 84.

The reception digital filter 83 filters an electrical signal inputted from the coherent receiver 81 with respect to the spectrum of the electrical signal, using a Nyquist filter or the like, based on FIR tap coefficients determined by the subcarrier configuration determiner 30, to thereby extract a spectrum having a desired frequency band.

The signal demodulator 84 demodulates the electrical signal obtained by the spectral extraction of the reception digital filter 83.

Here, description is given for processing performed by the narrowband subcarrier number determiner 31 in the subcarrier configuration determiner 30 to determine an optical frequency band to be used in a super-channel signal, the number of narrowband subcarriers to be inserted, and others, based on information on the number of optical filter stages to pass through.

Figure 7:
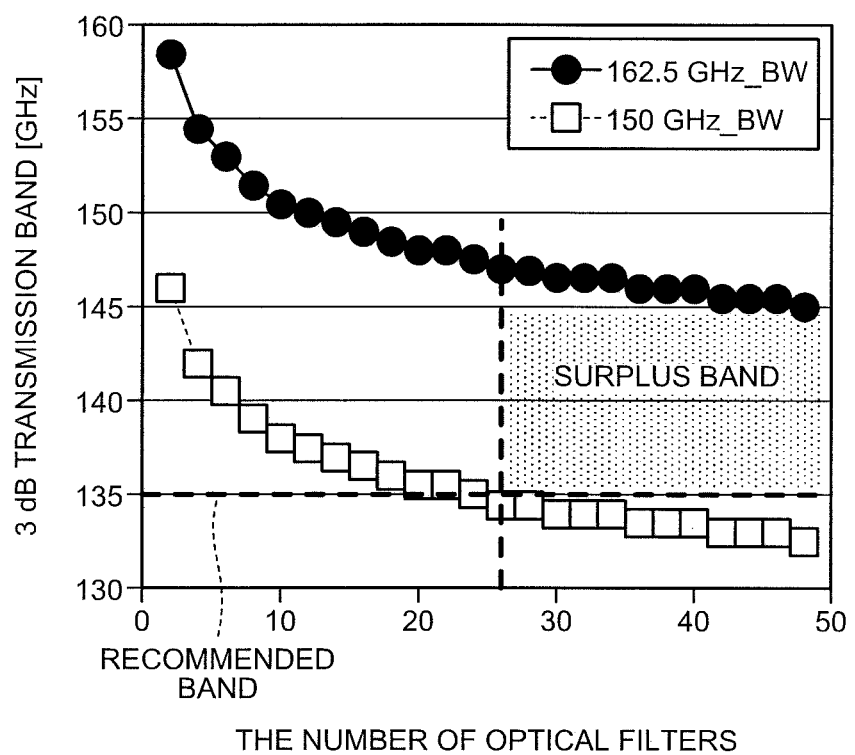

FIG. 7 is a graph illustrating an example of a relationship between the number of optical filters disposed in the transmission path 3 in the optical transmission system 4 and an optical filter transmission band according to the embodiment of the present invention. The horizontal axis indicates the number of optical filters arranged in the transmission path 3, and the vertical axis indicates the optical filter transmission band that can ensure a signal degradation of 3 dB or less in the optical frequency band of a super-channel signal that has passed through the optical filters. A line connecting white squares indicates change in the transmission band of the optical frequency band of a super-channel signal that has passed through optical filters with a transmission band of 150 GHz, and a line connecting black circles indicates change in the transmission band of the optical frequency band of a super-channel signal that has passed through optical filters with a transmission band of 162.5 GHz.

The optical filters arranged in the transmission path 3 select an optical filter to be used, that is, the transmission band of the optical filter, depending on the optical frequency band of a super-channel signal to be inputted. The optical filter has ideally a rectangular transmission band, but practically, the transmission band shape is not rectangular, and is a mountain-like shape gently sloping at both ends, for example, a fifth-order super-Gaussian shape. For this reason, a super-channel signal passing through the optical filter degrades in signal level at both ends of the optical frequency band every time the super-channel signal passes through the optical filter. Therefore, the more optical filters a super-channel signal passes through in the transmission path 3, the narrower the transmission band of the optical frequency band becomes.

In the example in FIG. 7, when an optical filter with a transmission band of 150 GHz is used and the number of optical filters is about two to six, the transmission band of the optical frequency band of a super-channel signal that has passed through the optical filters has a margin of coverage with respect to a recommended band. That is, there is a surplus band in the super-channel signal. The recommended band refers to a band in which the signal quality of subcarriers in a super-channel signal can be maintained at a certain level or greater. However, if the number of optical filters is about 20, the transmission band of the optical frequency band of a super-channel signal that has passed through the optical filters has no margin of coverage with respect to the recommended band. In the example in FIG. 7, when the number of optical filters is 26, the transmission band of a super-channel signal falls below the recommended band. Therefore, the optical transmission system 4 desirably uses an optical filter with a transmission band of 162.5 GHz. As illustrated in FIG. 7, when an optical filter with a transmission band of 162.5 GHz is used, the transmission band of a super-channel signal is about 10 GHz larger than a case of using an optical filter with a transmission band of 150 GHz, under a condition of the same number of optical filters.

Meanwhile, in the optical transmission system 4, the narrower the optical frequency band of a super-channel signal, the smaller the intervals between super-channel signals are made, so that a large number of super-channel signals can be transmitted. In the optical transmission system 4, therefore, an optical filter with a small transmission band is desirably used in a range where the recommended band can be secured, that is, when the number of optical filters to pass through is small.

In this way, in the optical transmission system 4, as long as the number of optical filters to pass through is small, there is a margin with respect to the recommended band, which results in the occurrence of a surplus band in a super-channel signal, but also when the number of optical filters to pass through becomes large, using optical filters each having a large transmission band results in occurrence of a surplus band in a super-channel signal. Therefore, when the subcarrier configuration determiner 30 determines that there is a certain surplus band in a super-channel signal in view of the relationship between the number of optical filters and the transmission band as illustrated in FIG. 7, the subcarrier configuration determiner 30 determines to insert a narrowband subcarrier into the super-channel signal. Furthermore, the subcarrier configuration determiner 30 determines the number of narrowband subcarriers to be inserted, and the modulation depth, the transmission rate, the signal band, and others of the narrowband subcarrier, based on the size of the surplus band.

Figure 8:
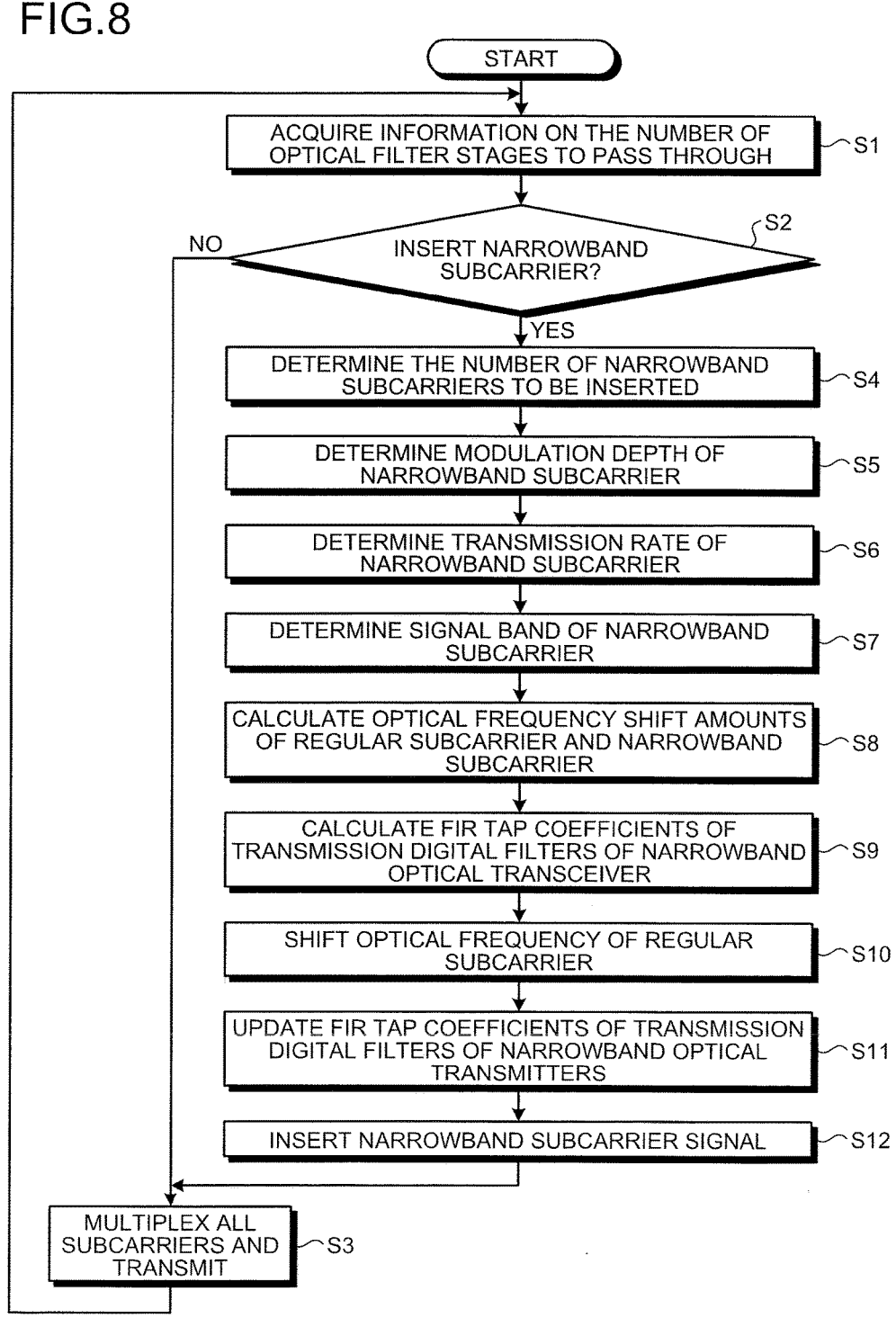
FIG. 8 is a flowchart illustrating an exemplary process in which the communication apparatus generates and transmits a super-channel signal.

Next, description is given for an operation of transmitting a super-channel signal from the communication apparatus 1 to the communication apparatus 2 via the transmission path 3. FIG. 8 is a flowchart illustrating an exemplary process in which the communication apparatus 1 according to the embodiment of the present invention generates and transmits a super-channel signal.

First, in the subcarrier configuration determiner 30 of the communication apparatus 1, the narrowband subcarrier number determiner 31 acquires information on the number of optical filter stages to pass through (step S1). For example, the narrowband subcarrier number determiner 31 acquires the information on the number of optical filter stages to pass through, from a routing table or the like included in a controller that manages the optical transmission system 4. In the example of the optical transmission system 4 illustrated in FIG. 1, the two communication apparatuses 1 and 2 are used. In general, however, a large number of communication apparatuses constitute an optical transmission system. Japanese Patent Application Laid-open No. 2010-098544, for example, describes that in such an optical transmission system, a controller 32 uses a path information database 52 to manage the transmission distance between nodes, transit nodes, and others when the nodes communicate with each other. An apparatus corresponding to the controller 32 managing the system stores, in the path information database 52, the routing table containing information on the number of optical filter stages to pass through so that other apparatuses in the system can use the routing table. Information on the number of optical filter stages to pass through itself is not unique to the present application. The narrowband subcarrier number determiner 31 can acquire the information from a controller or the like managing the system.

The narrowband subcarrier number determiner 31 calculates a surplus band in a super-channel signal based on information on the number of optical filter stages to pass through, and determines whether to insert a narrowband subcarrier in the super-channel signal to be transmitted from the communication apparatus 1 (step S2). Specifically, the narrowband subcarrier number determiner 31 calculates the surplus band from the relationship between the number of optical filters and the optical filter transmission band as illustrated in FIG. 7, and the number of optical filters between the communication apparatus 1 and the communication apparatus 2 based on the acquired information on the number of optical filter stages to pass through. For example, when the number of optical filters to pass through is two, the narrowband subcarrier number determiner 31 calculates the surplus band as 7 GHz from FIG. 7. When the number of optical filters to pass through is 26, the narrowband subcarrier number determiner 31 calculates the surplus band as 0 GHz from FIG. 7. The narrowband subcarrier number determiner 31 determines whether to insert a narrowband subcarrier, based on the calculated surplus band. For example, when the number of optical filters to pass through is two, the narrowband subcarrier number determiner 31 determines to insert a narrowband subcarrier since a surplus band of 3 GHz or more can be secured in a super-channel signal even with an optical filter with a transmission band of 150 GHz in the example in FIG. 7. Meanwhile, when the number of optical filters to pass through is 20, the narrowband subcarrier number determiner 31 determines not to insert a narrowband subcarrier since a surplus band of 3 GHz or more cannot be secured in a super-channel signal with an optical filter with a transmission band of 150 GHz in the example in FIG. 7. Furthermore, when the number of optical filters to pass through is 30, the narrowband subcarrier number determiner 31 determines to insert a narrowband subcarrier since an optical filter with a transmission band of 162.5 GHz is used and a surplus band of 3 GHz or more can be secured in a super-channel signal in the example in FIG. 7.

When the narrowband subcarrier number determiner 31 determines not to insert a narrowband subcarrier into a super-channel signal (step S2: No), in the communication apparatus 1, the subcarrier configuration determiner 30 does not instruct the narrowband optical transceiver 20 to generate a narrowband subcarrier, and the optical multiplexer/demultiplexer 40 multiplexes all of the four regular subcarriers #1 to #4 generated in the regular optical transceiver 10 and transmits the subcarriers to the communication apparatus 2 via the transmission path 3 (step S3).

When the narrowband subcarrier number determiner 31 determines to insert a narrowband subcarrier into the super-channel signal (step S2: Yes), the narrowband subcarrier number determiner 31 in the subcarrier configuration determiner 30 determines the number of narrowband subcarriers to be inserted (step S4). The narrowband subcarrier number determiner 31 determines the number of narrowband subcarriers to be inserted into the super-channel signal in view of the surplus band in the super-channel signal based on the relationship between the number of optical filters and the optical filter transmission band as illustrated in FIG. 7. Specifically, the larger the surplus band, the larger the narrowband subcarrier number determiner 31 makes the number of narrowband subcarriers to be inserted. The smaller the surplus band, the smaller the narrowband subcarrier number determiner 31 makes the number of narrowband subcarriers to be inserted. For example, when the number of optical filters to pass through is two, the narrowband subcarrier number determiner 31 determines to insert two narrowband subcarriers since a surplus band of 6 GHz or more can be secured in the super-channel signal even with each optical filter with a transmission band of 150 GHz in the example in FIG. 7. Meanwhile, when the number of optical filters to pass through is eight, the narrowband subcarrier number determiner 31 determines to insert one narrowband subcarrier since a surplus band of 3 GHz or more and less than 6 GHz can be secured in the super-channel signal even with each optical filter with a transmission band of 150 GHz in the example in FIG. 7. Furthermore, when the number of optical filters to pass through is 30, the narrowband subcarrier number determiner 31 determines to insert two narrowband subcarriers since each optical filter with a transmission band of 162.5 GHz is used and a surplus band of 6 GHz or more can be secured in the super-channel signal in the example in FIG. 7.

The modulation depth determiner 32 in the subcarrier configuration determiner 30 determines the modulation depth of a narrowband subcarrier to be inserted (step S5). Specifically, as the surplus band is larger, the modulation depth determiner 32 selects a modulation depth with a larger amount of information such as 16 QAM, and as the surplus band is smaller, the modulation depth determiner 32 selects a modulation depth with a smaller amount of information such as BPSK or QPSK. For example, the modulation depth determiner 32 sets BPSK when the surplus band calculated in the narrowband subcarrier number determiner 31 is 3 GHz or more and less than 6 GHz, sets QPSK when the surplus band is 6 GHz or higher and less than 9 GHz, and sets 16 QAM when the surplus band is 9 GHz or higher. The narrowband optical transceiver 20 generates the narrowband subcarriers #11 and #12 based on the modulation depth determined by the modulation depth determiner 32, and updates the modulation depth according to an instruction provided by the modulation depth determiner 32.

The transmission rate determiner 33 in the subcarrier configuration determiner 30 determines the transmission rate of a narrowband subcarrier to be inserted (step S6). Specifically, the larger the surplus band, the higher transmission rate the transmission rate determiner 33 selects, and the smaller the surplus band, the lower transmission rate the transmission rate determiner 33 selects. The narrowband optical transceiver 20 generates the narrowband subcarriers #11 and #12 based on the modulation depth determined by the modulation depth determiner 32, and updates the modulation depth according to an instruction provided by the modulation depth determiner 32. The narrowband optical transceiver 20 generates the narrowband subcarriers #11 and #12 based on the transmission rate determined by the transmission rate determiner 33, and updates the transmission rate according to an instruction provided by the transmission rate determiner 33.

The signal band determiner 34 in the subcarrier configuration determiner 30 determines the signal band of a narrowband subcarrier to be inserted (step S7). Specifically, the signal band determiner 34 determines the signal band based on the transmission rate determined by the transmission rate determiner 33.

The optical frequency shift amount calculator 35 in the subcarrier configuration determiner 30 calculates optical frequency shift amounts indicating the amounts of shifts of optical frequency bands in the super-channel signal for the regular subcarriers #1 to #4 generated by the regular optical transceiver 10 and the narrowband subcarriers #11 and #12 generated by the narrowband optical transceiver 20 (step S8). For example, when the narrowband subcarrier number determiner 31 determines to insert the one narrowband subcarrier #11, the optical frequency shift amount calculator 35 calculates the optical frequency shift amounts of the regular subcarriers #1 to #4 so that a signal band for the narrowband subcarrier #11 determined by the signal band determiner 34 can be secured between the regular subcarrier #2 and the regular subcarrier #3 in the super-channel signal. Furthermore, the optical frequency shift amount calculator 35 calculates the optical frequency shift amount of the narrowband subcarrier #11 so that the narrowband subcarrier #11 is disposed between the regular subcarrier #2 and the regular subcarrier #3. Likewise, when the narrowband subcarrier number determiner 31 determines to insert the two narrowband subcarriers #11 and #12, the optical frequency shift amount calculator 35 calculates the optical frequency shift amounts of the regular subcarriers #1 to #4 so that, in the super-channel signal, the signal band for the narrowband subcarrier #11 determined by the signal band determiner 34 can be secured in a low-frequency part, and the signal band for the narrowband subcarrier #12 determined by the signal band determiner 34 can be secured in a high-frequency part. Furthermore, the optical frequency shift amount calculator 35 calculates the optical frequency shift amounts of the narrowband subcarriers #11 and #12 so that the narrowband subcarrier #11 is disposed in the low-frequency part of the super-channel signal and the narrowband subcarrier #12 is disposed in the high-frequency part of the super-channel signal.

The FIR tap coefficient calculator 36 in the subcarrier configuration determiner 30 calculates FIR tap coefficients to be used in the transmission digital filters 73 of the narrowband optical transmitters 70 included in the optical transceivers 21 and 22 of the narrowband optical transceiver 20 (step S9). Specifically, the FIR tap coefficient calculator 36 calculates the FIR tap coefficients based on the number of narrowband subcarriers to be inserted, the modulation depth, the transmission rate, and others. The narrowband optical transceiver 20 generates the narrowband subcarriers #11 and #12 based on the FIR tap coefficients determined by the FIR tap coefficient calculator 36, and updates the FIR tap coefficients according to an instruction provided by the FIR tap coefficient calculator 36.

The optical frequency shift synchronizer 37 of the subcarrier configuration determiner 30 shifts the regular subcarriers #1 to #4 in optical frequency, based on the optical frequency shift amounts calculated by the optical frequency shift amount calculator 35 (step S10). The optical frequency shift synchronizer 37 first determines the order in which the positions of the regular subcarriers #1 to #4 are to be shifted, based on the signal bands in the super-channel signal in which the narrowband subcarriers #11 and #12 are disposed. When the one narrowband subcarrier #11 is inserted, the optical frequency shift synchronizer 37 determines the order such that the outer regular subcarriers #1 and #4 of the regular subcarriers #1 to #4 are antecedently shifted outward, and then the regular subcarriers #2 and #3 are shifted outward. Meanwhile, when the two narrowband subcarriers #11 and #12 are inserted, the optical frequency shift synchronizer 37 determines the order such that the inner regular subcarriers #2 and #3 of the regular subcarriers #1 to #4 are antecedently shifted inward, and then the regular subcarriers #1 and #4 are shifted inward. Then, the optical frequency shift synchronizer 37 specifically controls the optical frequency shifters 54 of the optical transceivers 11 to 14 included in the regular optical transceiver 10, based on the optical frequency shift amounts calculated by the optical frequency shift amount calculator 35, to control the shifts of positions, in the super-channel signal, of the regular subcarriers #1 to #4 to be outputted from the optical transceivers 11 to 14 to the optical multiplexer/demultiplexer 40. The regular optical transceiver 10 shifts the positions of the regular subcarriers #1 to #4 in the super-channel signal according to the optical frequency shift amounts determined by the subcarrier configuration determiner 30. Specific examples of the optical frequency shifts of the regular subcarriers #1 to #4 in the communication apparatus 1 will be described later.

The optical transceivers 21 and 22 of the narrowband optical transceiver 20 update the FIR tap coefficients of the transmission digital filters 73 of the narrowband optical transmitters 70, based on the FIR tap coefficients calculated by the FIR tap coefficient calculator 36 (step S11).

The optical frequency shift synchronizer 37 specifically controls the optical frequency shifters 74 of the optical transceivers 21 and 22 included in the narrowband optical transceiver 20, based on the optical frequency shift amounts calculated by the optical frequency shift amount calculator 35, to control the shifts of the positions, in the super-channel signal, of the narrowband subcarriers #11 and #12 to be outputted from the optical transceivers 21 and 22 to the optical multiplexer/demultiplexer 40. Then, the optical transceivers 21 and 22 shift the positions, in the super-channel signal, of the narrowband subcarriers #11 and #12 generated using the updated FIR tap coefficients, in accordance with the optical frequency shift amounts determined by the subcarrier configuration determiner 30, and output the resultant signals to the optical multiplexer/demultiplexer 40. By doing so, the narrowband optical transceiver 20 can insert the narrowband subcarriers #11 and #12 into the bands secured by the optical frequency shifts of the regular subcarriers #1 to #4 in the super-channel signal (step S12).

The optical multiplexer/demultiplexer 40 multiplexes all of the four regular subcarriers #1 to #4 generated in the regular optical transceiver 10 and the narrowband subcarriers #11 and #12 generated in the narrowband optical transceiver 20 and transmits the subcarriers to the communication apparatus 2 via the transmission path 3 (step S3).

The narrowband subcarrier number determiner 31 in the communication apparatus 1 acquires information on the number of optical filter stages to pass through every time the number of optical filters to pass through changes in response to change in the transmission path 3 between the communication apparatus 1 and the communication apparatus 2, and performs the process illustrated in the flowchart in FIG. 8.

Figure 9:
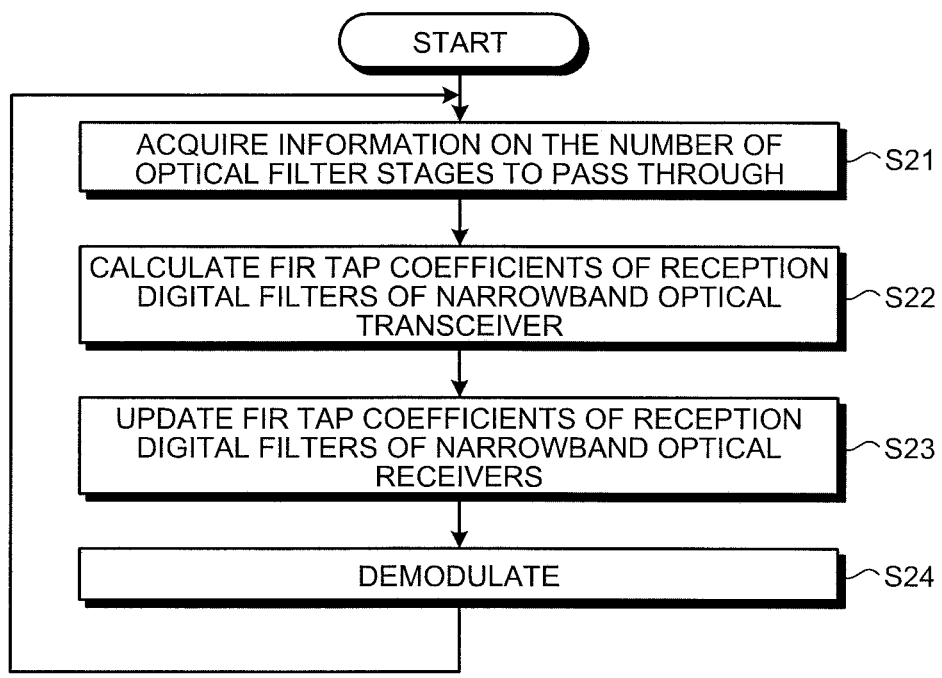
FIG. 9 is a flowchart illustrating an exemplary process in which the communication apparatus receives a super-channel signal.

FIG. 9 is a flowchart illustrating an exemplary process in which the communication apparatus 2 according to the embodiment of the present invention receives a super-channel signal.

First, in the subcarrier configuration determiner 30 of the communication apparatus 2, the narrowband subcarrier number determiner 31 acquires information on the number of optical filter stages to pass through (step S21). Processing performed by the narrowband subcarrier number determiner 31 of the communication apparatus 2 to acquire information on the number of optical filter stages to pass through is equal to the processing performed by the narrowband subcarrier number determiner 31 of the communication apparatus 1 to acquire information on the number of optical filter stages to pass through described above.

The FIR tap coefficient calculator 36 in the subcarrier configuration determiner 30 calculates FIR tap coefficients to be used in the reception digital filters 83 of the narrowband optical receivers 80 included in the optical transceivers 21 and 22 of the narrowband optical transceiver 20 (step S22). Specifically, the FIR tap coefficient calculator 36 calculates the FIR tap coefficients based on the number of narrowband subcarriers to be inserted, the modulation depth, the transmission rate, and others on the assumption that a super-channel signal is transmitted from the communication apparatus 2. Processing performed by the FIR tap coefficient calculator 36 of the communication apparatus 2 to calculate the FIR tap coefficients is equal to the processing performed by the FIR tap coefficient calculator 36 of the communication apparatus 1 to calculate the FIR tap coefficients. Here, description is given for the case where a super-channel signal is transmitted from the communication apparatus 1 to the communication apparatus 2 as an example. As long as super-channel signals are transmitted and received between the communication apparatus 1 and the communication apparatus 2, the FIR tap coefficient calculator 36 simultaneously calculates FIR tap coefficients of the transmission digital filters 73 of the narrowband optical transmitters 70 and the reception digital filters 83 of the narrowband optical receivers 80 included in the optical transceivers 21 and 22.

The optical transceivers 21 and 22 of the narrowband optical transceiver 20 update the FIR tap coefficients of the reception digital filters 83 of the narrowband optical receivers 80, based on the FIR tap coefficients calculated by the FIR tap coefficient calculator 36 (step S23).

Then, the signal demodulators 84 in the optical transceivers 21 and 22 perform processing to demodulate electrical signals filtered by the reception digital filters 83, using the updated FIR tap coefficients (step S24).

The narrowband subcarrier number determiner 31 in the communication apparatus 2 acquires information on the number of optical filter stages to pass through every time the number of optical filters to pass through changes in response to change in the transmission path 3 between the communication apparatus 2 and the communication apparatus 1, and performs the process illustrated in the flowchart in FIG. 9.

Next, description is given for a method of optical frequency shift when the regular subcarriers #1 to #4 are shifted in optical frequency in a super-channel signal, and the narrowband subcarrier #11 or the narrowband subcarriers #11 and #12 are inserted.

Figure 10:
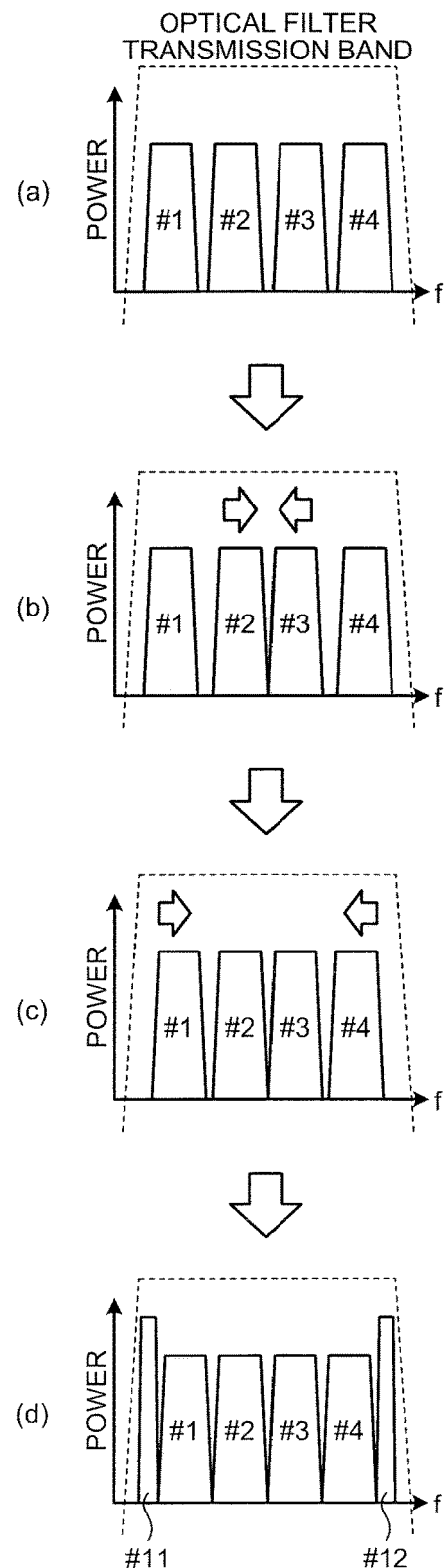
FIG. 10 is a chart illustrating an example of optical frequency shifts when narrowband subcarriers are inserted into outer portions in a super-channel signal in the communication apparatus.

FIG. 10 is a diagram illustrating an example of optical frequency shifts when the narrowband subcarriers #11 and #12 are inserted into outer sides in a super-channel signal in the communication apparatus 1 according to the embodiment of the present invention. FIG. 10(a) illustrates the positions of the regular subcarriers #1 to #4 when no narrowband subcarrier is inserted. In the communication apparatus 1, a number of subcarriers are multiplexed in the range of an optical filter transmission band illustrated in FIG. 10(a) to generate a super-channel signal.

First, in the communication apparatus 1, the optical frequency shift synchronizer 37 of the subcarrier configuration determiner 30 controls the optical frequency shifters 54 of the optical transceivers 12 and 13 of the regular optical transceiver 10, based on optical frequency shift amounts of the regular subcarriers #2 and #3 calculated by the optical frequency shift amount calculator 35. As illustrated in FIG. 10(b), the optical frequency shift synchronizer 37 shifts the regular subcarriers #2 and #3 to narrow the subcarrier interval, that is, in a direction toward a center of the super-channel signal.

Next, in the communication apparatus 1, the optical frequency shift synchronizer 37 of the subcarrier configuration determiner 30 controls the optical frequency shifters 54 of the optical transceivers 11 and 14 of the regular optical transceiver 10, based on optical frequency shift amounts of the regular subcarriers #1 and #4 calculated by the optical frequency shift amount calculator 35. As illustrated in FIG. 10(c), the optical frequency shift synchronizer 37 shifts the regular subcarriers #1 and #4 to narrow the subcarrier intervals, that is, in a direction toward a center of the super-channel signal.

Then, in the communication apparatus 1, the optical frequency shift synchronizer 37 of the subcarrier configuration determiner 30 controls the optical frequency shifters 74 of the optical transceivers 21 and 22 of the narrowband optical transceiver 20, based on optical frequency shift amounts of the narrowband subcarriers #11 and #12 calculated by the optical frequency shift amount calculator 35. As illustrated in FIG. 10(d), the optical frequency shift synchronizer 37 inserts the narrowband subcarriers #11 and #12 into the outsides parts in the super-channel signal. In the communication apparatus 1, the narrowband subcarriers #11 to #12 can be disposed in surplus band parts produced by shifting in optical frequency the regular subcarriers #1 to #4.

Figure 11:
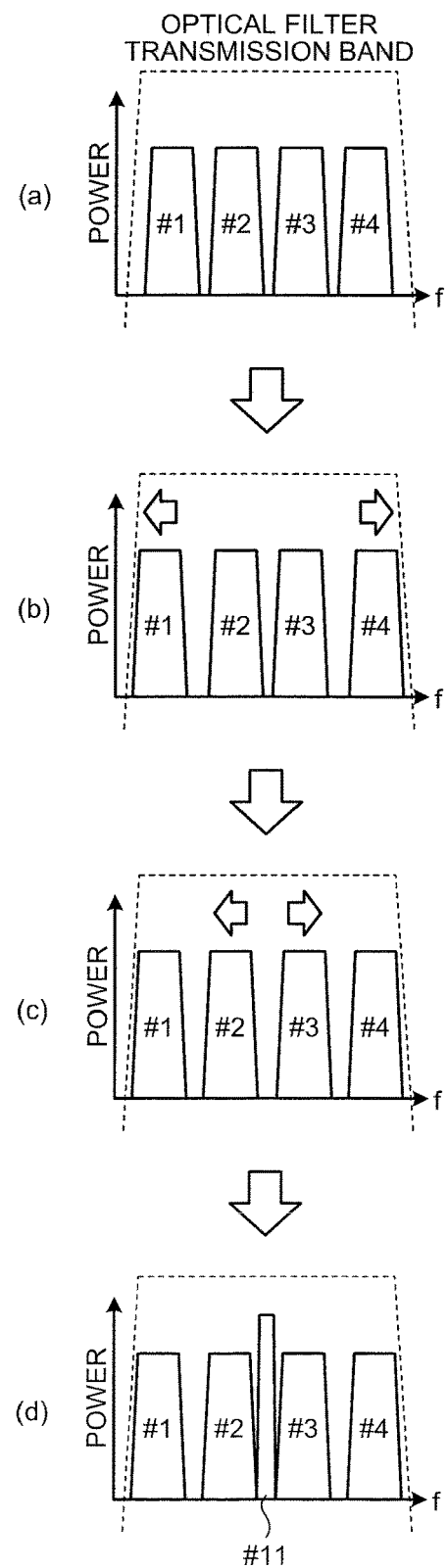
FIG. 11 is a chart illustrating an example of optical frequency shifts when a narrowband subcarrier is inserted into a central portion in a super-channel signal in the communication apparatus.

FIG. 11 is a chart illustrating an example of optical frequency shifts when the narrowband subcarrier #11 is inserted into a central part in a super-channel signal in the communication apparatus 1 according to the embodiment of the present invention. FIG. 11(a) illustrates the positions of the regular subcarriers #1 to #4 when no narrowband subcarrier is inserted, which is the same as in FIG. 10(a) described above.

First, in the communication apparatus 1, the optical frequency shift synchronizer 37 of the subcarrier configuration determiner 30 controls the optical frequency shifters 54 of the optical transceivers 11 and 14 of the regular optical transceiver 10, based on optical frequency shift amounts of the regular subcarriers #1 and #4 calculated by the optical frequency shift amount calculator 35. As illustrated in FIG. 11(b), the optical frequency shift synchronizer 37 shifts the regular subcarriers #1 and #4 to widen the subcarrier intervals, that is, outward in the super-channel signal.

Next, in the communication apparatus 1, the optical frequency shift synchronizer 37 of the subcarrier configuration determiner 30 controls the optical frequency shifters 54 of the optical transceivers 12 and 13 of the regular optical transceiver 10, based on optical frequency shift amounts of the regular subcarriers #2 and #3 calculated by the optical frequency shift amount calculator 35. As illustrated in FIG. 11(c), the optical frequency shift synchronizer 37 shifts the regular subcarriers #2 and #3 to widen the subcarrier interval therebetween, that is, outward in the super-channel signal.

Then, in the communication apparatus 1, the optical frequency shift synchronizer 37 of the subcarrier configuration determiner 30 controls the optical frequency shifter 74 of the optical transceiver 21 of the narrowband optical transceiver 20, based on an optical frequency shift amount of the narrowband subcarrier #11 calculated by the optical frequency shift amount calculator 35. As illustrated in FIG. 11(d), the optical frequency shift synchronizer 37 inserts the narrowband subcarrier #11 into the central part in the super-channel signal. In the communication apparatus 1, the narrowband subcarrier #11 can be disposed in a surplus band part produced by shifting in optical frequency the regular subcarriers #1 to #4.

Although transmission of a super-channel signal from the communication apparatus 1 to the communication apparatus 2 via the transmission path 3 has been described, transmission of a super-channel signal from the communication apparatus 2 to the communication apparatus 1 via the transmission path 3 can be implemented by a similar operation.

Next, the hardware configurations of the communication apparatuses 1 and 2 will be described. In the communication apparatuses 1 and 2, the regular optical transceiver 10 and the narrowband optical transceiver 20 are each implemented by an optical signal transmitter and an optical signal receiver. The optical multiplexer/demultiplexer 40 is implemented by an optical signal multiplex circuit and an optical signal demultiplex circuit. The subcarrier configuration determiner 30 is implemented by a processing circuit. That is, the communication apparatuses 1 and 2 each include a processing circuit for determining the number of narrowband subcarriers to be inserted, a modulation depth, a transmission rate, and a signal band, calculating optical frequency shift amounts and FIR tap coefficients, and controlling the optical frequency shifts of subcarriers. The processing circuit may be dedicated hardware, or may be a central processing unit (CPU) for executing programs stored in a memory and the memory.

Figure 12:
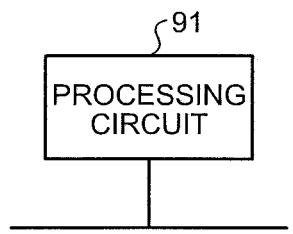
FIG. 12 is a diagram illustrating an example where the subcarrier configuration determiner is configured with dedicated hardware.

FIG. 12 is a diagram illustrating an example of a case where the subcarrier configuration determiner 30 according to the embodiment of the present invention is constructed by dedicated hardware. When the processing circuit is dedicated hardware, a processing circuit 91 illustrated in FIG. 12 corresponds, for example, to a single circuit, a combined circuit, a programmed processor, a parallel-programmed processor, an application specific integrated circuit (ASIC), a field programmable gate array (FPGA), or a combination of them. The functions of the subcarrier configuration determiner 30 may be implemented by the processing circuit 91 on an individual function basis, or the functions may be collectively implemented by the processing circuit 91.

Figure 13:
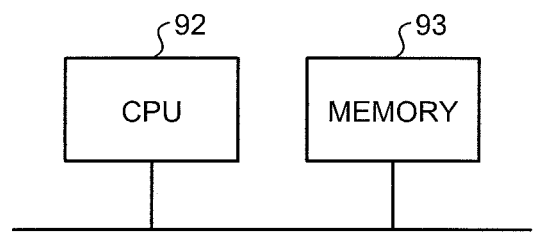
FIG. 13 is a diagram illustrating an example where the subcarrier configuration determiner is configured with a CPU and a memory.

FIG. 13 is a diagram illustrating an example of a case where the subcarrier configuration determiner 30 according to the embodiment of the present invention is constructed of a CPU and a memory. When the processing circuit is composed of a CPU 92 and a memory 93, the functions of the subcarrier configuration determiner 30 are implemented by software, firmware, or a combination of software and firmware. Software or firmware is described as a program and stored in the memory 93. In the processing circuit, the CPU 92 reads and executes the program stored in the memory 93, thereby implementing the functions. Specifically, when the subcarrier configuration determiner 30 is implemented by the processing circuit, the communication apparatuses 1 and 2 each include the memory 93 for storing programs that result in the execution of a step of determining the number of narrowband subcarriers to be inserted, a modulation depth, a transmission rate, and a signal band, a step of calculating optical frequency shift amounts and FIR tap coefficients, and a step of controlling the optical frequency shifts of subcarriers. These programs can be said to cause a computer to perform the procedure and method in the communication apparatuses 1 and 2. Here, the CPU 92 may be a processing unit, an arithmetic unit, a microprocessor, a microcomputer, a processor, a digital signal processor (DSP), or the like. The memory 93 corresponds, for example, to a nonvolatile or volatile semiconductor memory such as a random access memory (RAM), a read-only memory (ROM), a flash memory, an erasable programmable ROM (EPROM), or an electrically EPROM (EEPROM), or a magnetic disk, a flexible disk, an optical disk, a compact disk, a mini disk, a digital versatile disk (DVD), or the like.

Note that the functions of the subcarrier configuration determiner 30 may be implemented partly by dedicated hardware, and partly by software or firmware. For example, the function of determining the number of narrowband subcarriers to be inserted, a modulation depth, a transmission rate, and a signal band can be implemented by the processing circuit 91 as dedicated hardware, and the functions of calculating optical frequency shift amounts and FIR tap coefficients, and controlling the optical frequency shifts of subcarriers can be implemented by the CPU 92 reading and executing the programs stored in the memory 93.

In this way, the processing circuit can implement the above-described functions based on dedicated hardware, software, firmware, or a combination of them.

According to the present embodiment, in the optical transmission system 4 in which the communication apparatuses 1 and 2 transmit and receive super-channel signals via the transmission path 3 in which two or more optical filters are arranged, the communication apparatuses 1 and 2 determine the number of narrowband subcarriers to be inserted into a super-channel signal, the modulation depth, the transmission rate, and others, in view of the signal quality and the surplus band of the super-channel signal that change depending on the number of optical filters to pass through, as described above. Thus, in the communication apparatuses 1 and 2, a surplus band in a super-channel signal can be used effectively to improve transmission capacity.

The configuration illustrated in the above embodiment illustrates an example of the subject matter of the present invention, can be combined with other publicly known arts, and/or can be partially omitted or modified without departing from the scope of the present invention.

REFERENCE SIGNS LIST 1, 2 communication apparatus; 3 transmission path; 4 optical transmission system; 10 regular optical transceiver; 11, 12, 13, 14, 21, 22 optical transceiver; 20 narrowband optical transceiver; 30 subcarrier configuration determiner; 31 narrowband subcarrier number determiner; 32 modulation depth determiner; 33 transmission rate determiner; 34 signal band determiner; 35 optical frequency shift amount calculator; 36 FIR tap coefficient calculator; 37 optical frequency shift synchronizer; 40 optical multiplexer/demultiplexer; 50 regular optical transmitter; 51 regular transmission processing unit; 52, 72 data signal generator; 53, 73 transmission digital filter; 54, 74 optical frequency shifter; 55, 75 optical signal generation unit; 56, 76 light source; 57, 77 optical modulator; 60 regular optical receiver; 61, 81 coherent receiver; 62 regular reception processing unit; 63, 83 reception digital filter; 64, 84 signal demodulator; 70 narrowband optical transmitter; 71 narrowband transmission processing unit; 80 narrowband optical receiver; 82 narrowband reception processing unit.

The invention claimed is:

1. A communication apparatus comprising:
a regular optical transceiver including a first number of optical transceivers to each generate a regular subcarrier signal serving as a subcarrier signal;
a narrowband optical transceiver including a second number of optical transceivers each capable of generating a narrowband subcarrier signal serving as a subcarrier signal having a narrower frequency band than the regular subcarrier signal; and
a subcarrier configuration determiner to determine a configuration of a plurality of subcarrier signals in a super-channel signal, based on information on a number of optical filter stages to pass through, which is information on a number of optical filters through which the super-channel signal containing the plurality of subcarrier signals passes in a transmission path when the super-channel signal is transmitted to a counterpart communication apparatus, the plurality of subcarrier signals in the super-channel signal including a regular subcarrier signal generated by the regular optical transceiver and a narrowband subcarrier signal generated by the narrowband optical transceiver,
wherein the regular optical transceiver shifts a position of the regular subcarrier signal in the super-channel signal, according to optical frequency shift amounts indicating shift amounts of the plurality of subcarrier signals indicated by the configuration determined by the subcarrier configuration determiner, and
the narrowband optical transceiver shifts a position of the narrowband subcarrier signal in the super-channel signal, according to the optical frequency shift amounts.

2. The communication apparatus according to claim 1, wherein
the narrowband optical transceiver updates a modulation depth, a transmission rate, and tap coefficients of transmission and reception digital filters, which are used to generate the narrowband subcarrier signal in the super-channel signal, according to an instruction provided by the subcarrier configuration determiner.

3. The communication apparatus according to claim 1, wherein
the plurality of subcarrier signals in the super-channel signal includes a number of narrowband subcarrier signals generated by the narrowband optical transceiver, and
the subcarrier configuration determiner calculates a surplus band in the super-channel signal, based on the information on the number of optical filter stages to pass through, and determines the number of narrowband subcarrier signals inserted into the super-channel signal.

4. The communication apparatus according to claim 1, wherein
the number of subcarrier signals in the super-channel signal includes a plurality of regular subcarrier signals generated by the regular optical transceiver, and
the subcarrier configuration determiner calculates a surplus band in the super-channel signal, based on the information on the number of optical filter stages to pass through, and determines optical frequency shift amounts of the regular subcarrier signals in the super-channel signal.

5. The communication apparatus according to claim 1, wherein
the number of subcarrier signals in the super-channel signal includes a plurality of regular subcarrier signals generated by the regular optical transceiver, and
the subcarrier configuration determiner determines an order in which the positions of the regular subcarrier signals in the super-channel signal are shifted, based on a band in the super-channel signal in which the narrowband subcarrier signal is disposed.

6. The communication apparatus according to claim 1, wherein
the subcarrier configuration determiner determines the modulation depth of the narrowband subcarrier signal in the super-channel signal, based on the information on the number of optical filter stages to pass through.

7. The communication apparatus according to claim 1, wherein
the subcarrier configuration determiner acquires the information on the number of optical filter stages to pass through every time the transmission path is changed.

8. The communication apparatus according to claim 1, wherein
information contained in the narrowband subcarrier signal in the super-channel signal is a data signal or an error-correcting code.

9. A subcarrier signal arrangement method comprising:
a subcarrier configuration determination step of a subcarrier configuration determiner determining a configuration of a plurality of subcarrier signals in a super-channel signal, based on information on a number of optical filter stages to pass through, which is information on a number of optical filters through which the super-channel signal passes in a transmission path when the super-channel signal is transmitted to a counterpart communication apparatus;
a regular subcarrier signal generation step of a regular optical transceiver generating regular subcarrier signals serving as subcarrier signals whose positions in the super-channel signal are shifted according to optical frequency shift amounts indicating shift amounts of the plurality of subcarrier signals represented by the configuration determined by the subcarrier configuration determiner; and
a narrowband subcarrier signal generation step of a narrowband optical transceiver generating a predetermined number of narrowband subcarrier signals, the predetermined number being determined by the subcarrier configuration determiner, the narrowband subcarrier signals each serving as a subcarrier signal having a narrower frequency band than the regular subcarrier signal, a position of each narrowband subcarrier signal in the super-channel signal being shifted according to the optical frequency shift amount.

* * * * *